June 6, 1967 G. E. GATTNER ETAL 3,324,242
CALL METERING IN COMMUNICATION SYSTEMS
Filed Dec. 30, 1963
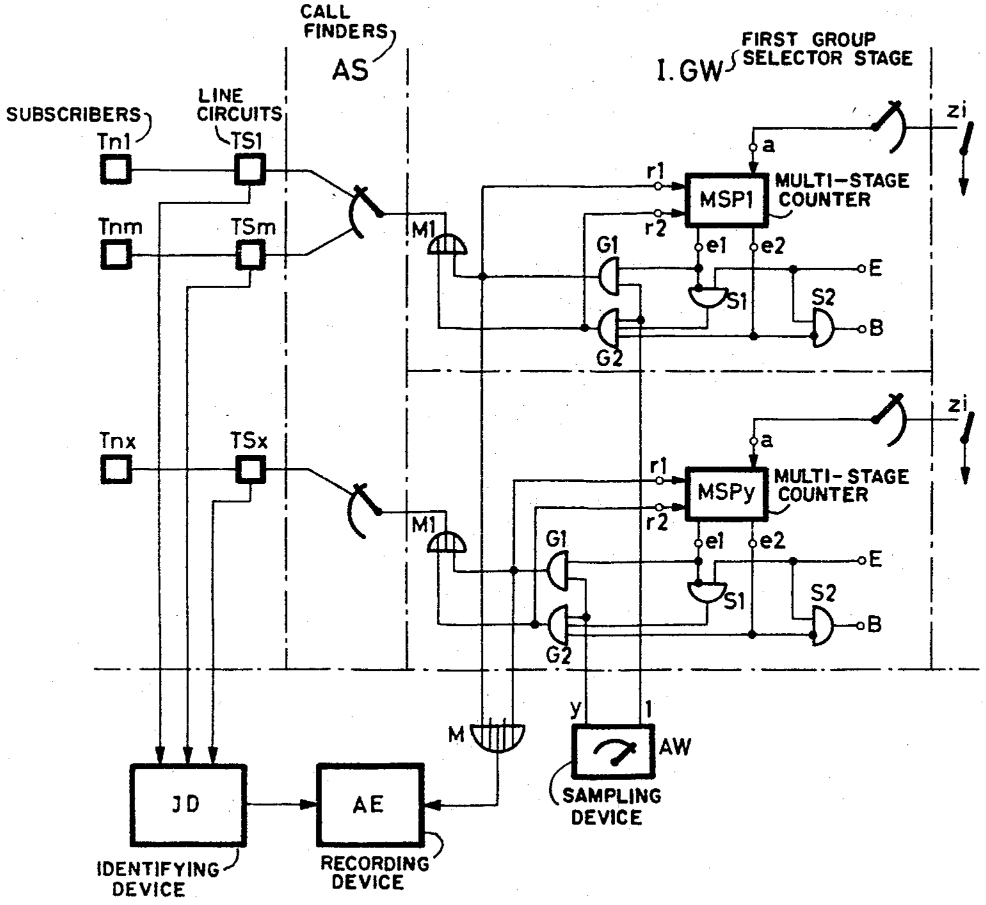

United States Patent Office 3,324,242
Patented June 6, 1967

3,324,242

CALL METERING IN COMMUNICATION SYSTEMS

Günther E. Gattner and Karl-Heinz Widdel, Munich, Germany, assignors to Siemens & Halske Aktiengesellschaft, Berlin and Munich, a corporation of Germany Filed Dec. 30, 1963, Ser. No. 334,309
Claims priority, application Germany, Jan. 2, 1963, S 83,136
5 Claims. (Cl. 179—9)

The invention disclosed herein relates to the supervision and seizure of signal impulses and is particularly concerned with the seizure of call metering impulses appearing in communication systems at random sequence upon signal lines extending by way of connection devices.

It is known to sample individual signal lines continuously in cyclic sequence so as to ascertain and seize signal impulses, for example, metering impulses, appearing at random sequence but with a definite minimum spacing as to time, upon lines extending in communication systems by way of connection devices. This sampling is generally effected with the aid of coincidence gates, for example, diode gates, which are successively placed in operation. A control impulse, resulting upon coincidence of a sampling pulse with a signal impulse, is in such operation extended to a recording device.

All signal lines must be sampled once for the duration of the shortest signal impulse so as to make sure that all signal impulses that might occur are reliably seized. However, this requires great operating speeds which in turn poses especially in the case of drum storers high requirements with respect to the mechanical construction of the equipment, so that the corresponding arrangements become generally very expensive.

In order to reduce the required sampling speed, it is in accordance with another known method proposed to assign to each signal line a binary storage element, for example, a ferromagnetic ring core, for temporarily storing respective incoming signal impulses, so that a signal impulse which is to be registered or recorded, is in simple manner lengthened beyond its inherent duration. Since such storage elements are not adapted for metering (counting), each storage element must be read until receipt of the next following signal impulse, and the corresponding information must be recorded at another place. The reading of the individual storage elements which are preferably combined in a matrix, is effected periodically in a sequence as to time which is shorter than the temporal spacing between two successive signal impulses, the respective storage element being thereby reset to its initial condition and the control signal thus obtained being used as a criterion for the recording of a signal impulse.

The registering or recording of the individual signal impulses can be effected by conducting to an automatically legibly registering recorder, instead of the respective signal impulse, the count position of the sampling device or, in the case of a storage arrangement with storage sections assigned respectively individually to the individual signal lines, by releasing individual information contained in such storage sections, depending upon the position of the sampling device and storing the released information again in altered or unchanged condition depending upon the presence of a control signal. The alteration of the information may consist, for example, in adding thereto the value "1."

It is further known, in accordance with another method, in connection with communication lines extending by way of connecting devices, to arrange the storage elements in the connection devices which are directly connectible with subscriber lines, for example, in the first group selector stage, and to read out the corresponding information at such connecting devices. The required sampling speed for seizing the signal impulses that may occur can be reduced further since the number of these connecting devices is generally smaller than the number of signal lines which have to be supervised. However, as compared with the previously mentioned methods, there is no fixed allocation between the connecting devices which are to be sampled and the signal lines which are connectible therewith, thus making it necessary to ascertain in connection with each seized signal impulse, the signal line which is respectively involved. The recording signals appearing upon sampling the stored storage elements are therefore by way of the respective signal line conducted to an identification device and the line number thus ascertained is stored directly (instead of a signal impulse) or utilized for the operative control of the respective storer section of a registering or recording device.

Still another method has been proposed wherein the time consuming allocation of each signal impulse, by the identifying device, is avoided by identifying the respectively connected communication line in known manner by an identifying device, upon seizure of a connecting device which is to be read and by holding the identification result in a storage member assigned to the respective seized connection device, for the duration of the seizure thereof, the line numbers stored in this manner being utilized for operatively controlling the processing by the central recording device of the signal impulses ascertained in the reading operation.

It is further known to provide in connection with communication systems, especially private branch exchange telephone systems, multistable storage elements in the outgoing transmissions and exchange transmissions, respectively, for the reception of metering (counting) impulses. These storers generally have only a limited storage capacity, for example, one-hundred counting impulses, and there is therefore effected an intermediate printing, responsive to a corresponding command, whenever the storage capacity is reached. Upon termination of a call, the remaining count impulses are in encoded or in uncoded form likewise extending to the printing device.

Proceeding from these known methods or systems, the present invention is concerned with a system for seizing signal impulses, for example, call metering or counting impulses occurring at random sequence but with definite temporal minimum spacing upon communication lines extending between connection devices, by repeated or periodical reading of the connection devices connected with the communication lines which are to be supervised, such reading being effected with the aid of reading switches which are individually assigned to the communication lines and affected by the signal impulses, the system also including an identification device and a central recording or registering device.

According to the invention, the reading switches which are assigned to the connecting devices are constructed as multistable storers of known type, for example, ferromagnetic counting chokes or counting chains, means being provided for abruptly restoring the multistable storer elements by the action of a sampling pulse to initial resting or normal position whenever the storage capacity thereof is reached, for example, after ten impulses, irrespective of continued seizure of the respective connecting device, while effecting the switching thereof into the normal position, from a position within the storage capacity, upon termination of the seizure, in step-by-step manner, by the action of sampling pulses, and means for differently affecting the central recording device depending upon the manner of restoration of the storers.

The use of reading switches constructed as multistable storage elements reduces in known manner the register requirements for the central recording device. Moreover, the resetting of the storage elements by the action of the same type of reading pulses, irrespective of whether it takes place abruptly or in step-by-step manner, makes it possible to employ sampling devices which are present as a matter of course, since the emptying of only partially filled storer elements can be organically included in the normal sampling operation. Only the recording device will require a slight additional expenditure for the marking of the different kind of resetting mode and different manner of counting resulting therefrom. However, such expenditure can be held within limits by conducting to the recording device which normally registers only one signal impulse, an additional control signal merely incident to the abrupt resetting of a storage element, such additional control signal effecting a plural registration corresponding to the storer capacity.

Depending upon the kind of registering, there will be required an additional printer magnet, in the case of systems in which the line number is to be printed instead of an indication corresponding to the respective signal impulse, and in systems containing in a storage arrangement storage sections assigned individually to the individual signal lines, the information content of which is changed depending upon the presence of a register impulse, for example, by the addition of the digit "1," there will be required an additional stage which is appropriately liberal in the selection of the term of a sum, for example, "1" or "10."

Further features of the invention will appear from the description which is rendered below with reference to the accompanying drawing.

The drawing shows an embodiment of the system underlying the invention as applied in the metering of calls in a telephone system. A detailed representation of individual structural groups has been omitted since none of such component groups is inherently bound to any one definite form. Any desired and suitable embodiment may be used for the respective components so long as it satisfies the functions required by the invention.

The drawing shows in its upper portion subscriber lines T*n*1 to T*nx* with the line circuits TS1 to TS*x* which have by way of suitable preselectors or call finders AS in known manner access to connection devices, for example, relay sets of the first group selector stage I.GW. In the lower portion of the drawing is shown the identifying device JD and the central recording or registering device AE as well as the sampling device AW.

The operation of the system or arrangement is as follows:

The counting or metering impulses incoming by way of the communication line or trunk, which impulses are effected by means of contacts such as *zi*, arrive at the input *a* of the multistable circuit member or counter MSP which is arranged in the first group selection stage LGW of each outgoing line or trunk. The respective multistable switching or circuit member such as MSP which may be in known manner constructed as a ferromagnetic counting choke or counting chain, effects an intermediate storing of the received impulses.

The respective storage element MSP has two outputs *e*1 and *e*2, one of these outputs (*e*1) carrying a signal when the storage capacity is reached and the other output (*e*2) carrying a signal when the element leaves its normal position. The respective outputs are extended to separate control switches G1, G2 which are operatively controlled in known manner by means of the sampling device AW.

Assuming that a signal appears at the output *e*1, there will be given off a registering impulse at the output of the control switch G1, responsive to each reading impulse acting on the other signal input of the control switch G1, such registering impulse being extended in known manner by way of the mixing gate M1, the switch arm of the call finder AS, the respective subscriber line circuit TS, to the identification device JD and from there in the form of the subscriber line number to the recording or registering device AE. A command is at the same time given to the recording device AE, by way of the mixing gate M that there is to be recorded, instead of only one counting pulse, a number of counting pulses which corresponds to the storage capacity of the multistable storage element MSP. This signal acts at the same time upon the input r1 of the sampled multistable storage element and effects abrupt resetting thereof to the normal position.

The output *e*1 is also connected with the control input of a further control switch S1 which delivers at its output a signal only when there is no signal on the control input *e*1 but when the signal input carries a signal signifying termination of a call. This control switch S1 serves for the supervision of the storage condition of the respectively associated multistable storage element MSP after termination of a call and effects the switching over of the control switch G1 to the control switch G2 in the event that there is a partial storing. Accordingly, as soon as there is a signal at the output *e*2 of the multistable storage element MSP as well as at the output of the control switch S1, each reading pulse will cause appearance of a registering pulse at the output of the control switch G2, such registering pulse causing the identification of the connected subscriber line and the operative control of the central registering device depending thereon, just as such controls are caused by the registering pulse at the output of the control switch G1.

This registering pulse also acts on the input *r*2 of the multistable storage element MSP and resets such element by one counting stage. When the multistable storage element reaches its normal or resting position, in the course of the resetting thereof by the action of the sampling, the output *e*2 becomes free of a signal, and the control switch G2 is blocked. Subsequent sampling pulses remain ineffective.

The control switch S2 is operatively actuated when the normal position is reached, so that the call-termination signal which appears at the output B can become effective for releasing the connection device.

Changes may be made within the scope and spirit of the appended claims which define what is believed to be new and desired to have protected by Letters Patent.

We claim:

1. A signal pulse detection and allocation arrangement for a telecommunication system, for detecting a signal pulse or a series of signal pulses allocated to one of a plurality of lines and for storing an indication of such signals in a recording unit as signals allocated to the appropriate line, comprising a plurality of series combinations of gating means and a multi-stage signal pulse counter with a number of stages, one such combination being at least temporarily allocated to each line, with the signal pulses allocated to a particular line being fed to the appropriate series combination, such gating means operatively connecting the counter to the recording unit, means for supplying scanning pulses to the gating means of such combination in cyclic sequence, said gating means including a connection to said counter operative to initiate a resetting thereof to zero in the presence of an output signal at such gating means representing $n$ signal pulses, means for simultaneously feeding a signal from said gating means to the recording unit for the designation therein of $n$ signal pulses, said gating means including a further connection to said counter operative, upon the occurrence of a signal indicating the termination of the supply of signal pulses allocated to the line involved, to feed the signal pulses stored in the counter, numbering less than $n$, to the input of the recording unit as individual signal pulses.

2. An arrangement according to claim 1, wherein $n$ equals 10.

3. An arrangement according to claim 1, wherein each gating means comprises two gates, the first of which is arranged to pass signals representing $n$ signal pulses and the second of which is arranged to pass signals respectively representing one signal pulse.

4. An arrangement according to claim 3, comprising in further combination, a mixing gate operatively disposed between said recording unit and said first mentioned gates for feeding the control signal from the output of each first gate to the recording unit.

5. A signal pulse detection and allocation arrangement for a telecommunication system, for detecting a signal pulse or a series of signal pulses allocated to one of a plurality of lines and for storing an indication of such signals in a recording unit as signals allocated to the appropriate line, comprising a multi-stage signal pulse counter having $n$ number of stages, said counter having a pulse input for advancing the counter, a pulse input for backing the counter, and a reset input for resetting a full counter, said counter having a pair of outputs connected respectively to a pair of gates, one being responsive to a full counter and the other responsive to a partially filled counter, means for feeding scanning pulses to the respective gates in cyclic sequence, the gate connected to said first output being operative to pass a pulse at its output in the presence of a scanning pulse and an output signal at said first output, means operatively connecting the output of such gate to the reset input of said counter for the resetting thereof, the gate connected to said second output being operatively connected at its output to the backing input of said counter and operative to pass a pulse to its output in the presence of a termination signal at such gate and an output signal at the second output of said counter, and means for connecting the respective outputs of said gates to said recording unit, for the designation therein, responsive to an output pulse at the first gate, of $n$ signal pulses, and responsive to an output pulse at the second gate, to feed the signal pulses, numbering less than $n$, then stored in the counter to the recording unit as individual signal pulses.

References Cited

UNITED STATES PATENTS

| | | | |
|---|---|---|---|
| 2,782,256 | 2/1957 | Malthaner ---------- | 179—7.1 |
| 2,849,535 | 8/1958 | Baker et al. --------- | 179—7.1 |
| 2,979,569 | 4/1961 | Kosten ------------- | 179—7.1 |
| 3,222,457 | 12/1965 | Ambrosino ------------ | 179—9 |

KATHLEEN H. CLAFFY, *Primary Examiner.*

H. ZELLER, *Assistant Examiner.*